US011958559B2

(12) United States Patent
Hermanson et al.

(10) Patent No.: US 11,958,559 B2
(45) Date of Patent: Apr. 16, 2024

(54) CYCLE SEAT

(71) Applicant: Terry Hermanson, New York, NY (US)

(72) Inventors: Terry Hermanson, New York, NY (US); Huang Meng-Suen, Hong Kong (CN)

(73) Assignee: Terry Hermanson, New York, NY (US)

( * ) Notice: Subject to any disclaimer, the term of this patent is extended or adjusted under 35 U.S.C. 154(b) by 0 days.

(21) Appl. No.: 17/954,941

(22) Filed: Sep. 28, 2022

(65) Prior Publication Data

US 2023/0114642 A1   Apr. 13, 2023

Related U.S. Application Data

(60) Provisional application No. 63/249,190, filed on Sep. 28, 2021.

(51) Int. Cl.
*B62J 1/26* (2006.01)
*B62J 1/08* (2006.01)

(52) U.S. Cl.
CPC .. *B62J 1/26* (2013.01); *B62J 1/08* (2013.01)

(58) Field of Classification Search
CPC ..................................... B62J 1/08; B26J 1/26
See application file for complete search history.

(56) References Cited

U.S. PATENT DOCUMENTS

| 335,246 | A | * | 2/1886 | Rothgiesser | ............. | B62J 1/002 |
| | | | | | | 297/202 |
| 345,424 | A | * | 7/1886 | Fish | .......................... | B62J 1/02 |
| | | | | | | 297/203 |
| 545,421 | A | | 8/1895 | Beach | | |
| 605,672 | A | * | 6/1898 | Hunt | .......................... | B62J 1/10 |
| | | | | | | 297/204 |
| 1,213,674 | A | * | 1/1917 | Maslen | ...................... | B62J 1/10 |
| | | | | | | 297/219.11 |
| 1,391,409 | A | * | 9/1921 | Roberts | ...................... | B62J 1/08 |
| | | | | | | 297/207 |

(Continued)

FOREIGN PATENT DOCUMENTS

| DE | 102008013723 A | 9/2009 |
| GB | 01059 A | 11/1915 |

(Continued)

OTHER PUBLICATIONS

The BananaHama Bikes Project by BananaHama LLC.— Kickstarter, https://www.kickstarter.com/projects/1360891828/the-bananahama-bikes-project?ref-category; accessed: Jan. 21, 2021.

(Continued)

*Primary Examiner* — Philip F Gabler
(74) *Attorney, Agent, or Firm* — Venable LLP

(57) ABSTRACT

Seat for a bicycle including a frame and a cover. The frame includes a front portion, a rear portion, and a central portion between the front portion and the rear portion. The cover includes a seating panel and at least one side panel or at last one tensioning panel. The seating panel includes a seating surface facing an upward direction. The seating panel is supported by the front portion of the frame and the rear portion of the frame and spans from the front portion of the frame and the rear portion of the frame.

20 Claims, 10 Drawing Sheets

(56) References Cited

U.S. PATENT DOCUMENTS

| | | | |
|---|---|---|---|
| 5,362,130 A | 11/1994 | Hoffman | |
| 5,553,916 A * | 9/1996 | Yu ............................. | B62J 1/02 |
| | | | 297/197 |
| 5,597,202 A | 1/1997 | Andersen | |
| 5,879,050 A * | 3/1999 | Marui ........................ | B62J 1/00 |
| | | | 297/195.1 |
| 6,666,507 B1 * | 12/2003 | Ringgard ................... | B62J 1/00 |
| | | | 297/195.1 |
| 7,059,674 B2 * | 6/2006 | Garland ..................... | B62J 1/00 |
| | | | 297/202 |
| 8,851,566 B2 * | 10/2014 | Bigolin ...................... | B62J 1/24 |
| | | | 297/215 |
| 9,016,779 B2 | 4/2015 | Attey | |
| 9,205,888 B1 | 12/2015 | Watts et al. | |
| 10,730,578 B2 | 8/2020 | Ahrens et al. | |
| 2004/0004374 A1 | 1/2004 | Garland et al. | |
| 2013/0334789 A1 | 12/2013 | Ingrim | |
| 2017/0297642 A1 | 10/2017 | Hsu et al. | |

FOREIGN PATENT DOCUMENTS

| | | | |
|---|---|---|---|
| GB | 317063 A | 2/1931 | |
| GB | 585016 A | 1/1947 | |
| KR | 20-0375856 Y1 | 3/2005 | |
| TW | 200829471 A | 7/2008 | |
| WO | 2007/063526 A | 6/2007 | |

OTHER PUBLICATIONS

Search Report and Written Opinion dated Dec. 19, 2022, in International Patent Application No. PCT/US2022/045045.

* cited by examiner

CYCLE SEAT

CROSS-REFERENCE TO RELATED APPLICATIONS

This application claims the benefit under 35 U.S.C. § 119(e) of U.S. Provisional Patent Application No. 63/249,190, filed Sep. 28, 2021, and titled "SOFT BICYCLE SEAT," the entirety of which is incorporated herein by reference.

FIELD OF THE INVENTION

The invention relates to a seat for a rider of a cycle, such as bicycle.

BACKGROUND OF THE INVENTION

Bicycles have relatively unique seats as compared to other modes of transportation and office or home seats. There is a variety of styles that have been considered over the years and may vary based on the use of the bicycle (e.g., a casual bicycle, a road bike, or a mountain bike). Traditional bicycle seats, particularly those used on road bikes, can be hard and uncomfortable, causing soreness (e.g., so-called "saddle sores").

SUMMARY OF THE INVENTION

In one aspect, the invention relates to seat for a rider including a frame and a cover. The frame includes a front portion, a rear portion, and a central portion between the front portion and the rear portion. Each of the front portion and the rear portion have a supporting portion. The supporting portion of the front portion and the supporting portion of the rear portion are positioned to define a cavity in the central portion. The cover includes a seating panel and a plurality of side panels. The seating panel is supported by the supporting portions of the front portion of the frame and the rear portion of the frame to span over the cavity. The seating panel including a seating surface facing an upward direction. The plurality of side panels spans from the front portion to the rear portion. Each side panel includes a side surface facing outward from the seat in a direction different from the upward direction.

In another aspect, the invention relates to seat for a rider including a frame and a cover. The frame includes a front portion, a rear portion, and a central portion between the front portion and the rear portion. Each of the front portion and the rear portion have a supporting portion. The supporting portion of the front portion and the supporting portion of the rear portion are positioned to define a cavity in the central portion. The cover includes a seating panel and at least one tensioning panel. The seating panel is supported by each of the supporting portions of the front portion of the frame and the rear portion of the frame. The seating panel spans from the front portion of the frame to the rear portion of the frame and includes a seating surface. The at least one tensioning panel spans from the front portion of the frame to the rear portion of the frame. The tensioning panel has a tension greater than the seating panel.

In a further aspect, the invention relates to a seat for a rider including a frame and a cover. The frame includes a front portion, a rear portion, and a central portion between the front portion and the rear portion. The cover includes a seating panel and a plurality of side panels. The seating panel includes a seating surface facing an upward direction. The seating panel is supported by the front portion of the frame and the rear portion of the frame and unsupported by the central portion of the frame. The plurality of side panels spans from the front portion to the rear portion. Each side panel includes a side surface facing outward from the seat in a direction different from the upward direction.

These and other aspects of the invention will become apparent from the following disclosure.

DETAILED DESCRIPTION OF THE PREFERRED EMBODIMENTS

As discussed above, traditional bicycle seats can be hard and uncomfortable, particularly performance seats designed for control and not for comfort. Other bicycle seats may be designed for comfort, but such seats tend to lack features providing for good control of the bicycle that are otherwise present in the performance seats. Embodiments of the bicycle seat discussed herein provide for a comfortable ride using a seating panel suspended between a forward portion of a seat frame and a rear portion of the seat frame. The seating panel has a tension such that, when a person sits on the seating panel, the seating panel conforms at least in part to the person's buttocks to have a concave shape between the forward portion of the seat frame and the rear portion of the seat frame. These side panels can thus be used by the rider to help steer the bicycle such as by using his or her inner thigh to press on one of the side panels. In addition, these side panels help stabilize the seating panel, which is otherwise only supported by the forward portion of the seat frame and the rear portion of the seat frame. In some embodiments, the side panels of the seat have a tension greater than the seating panel.

Figure 1:
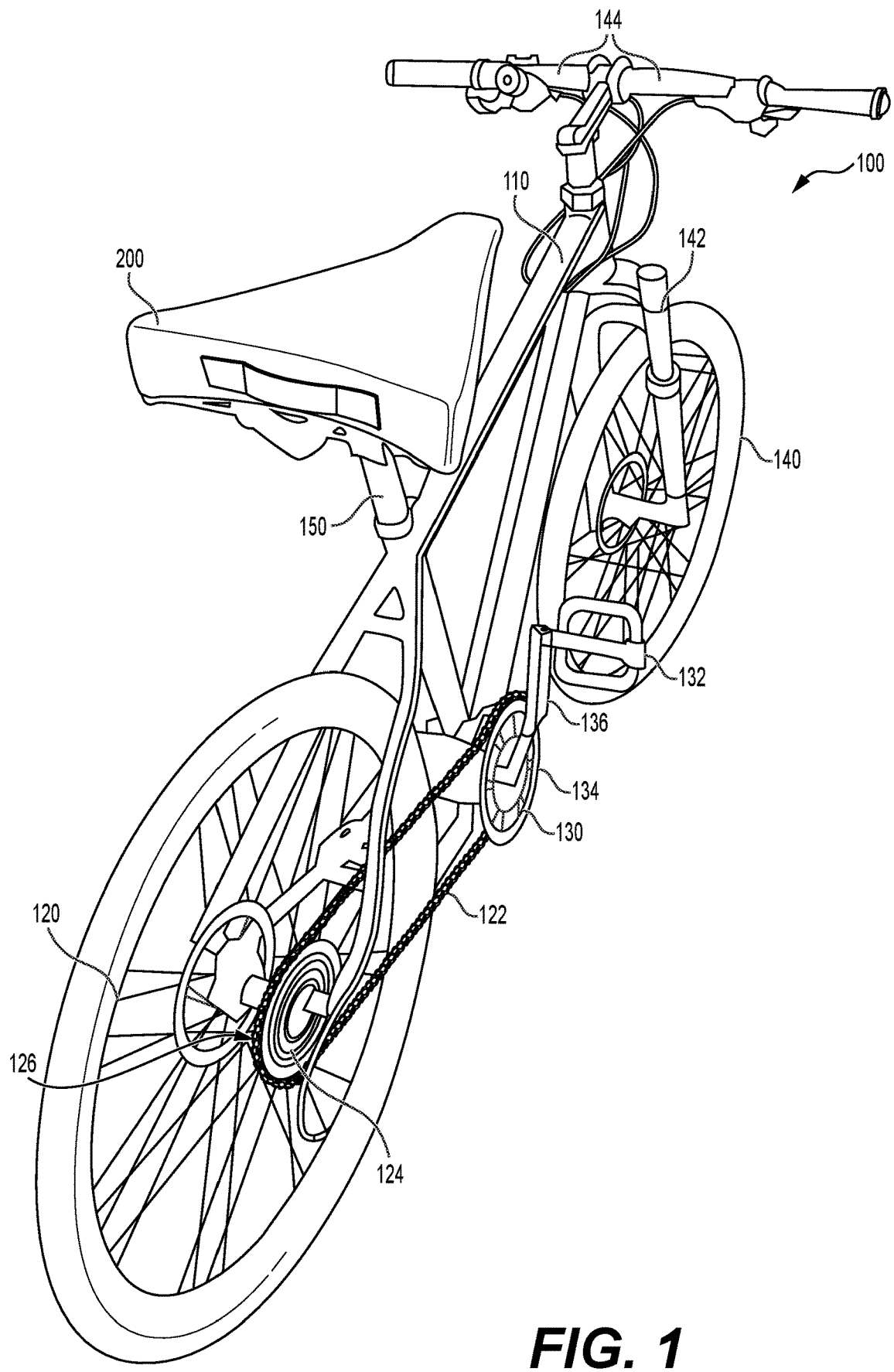
FIG. 1 shows a bicycle equipped with a bicycle seat in accordance with a preferred embodiment of the invention.

FIG. 1 shows a bicycle 100 equipped with a bicycle seat 200 in accordance with a preferred embodiment of the invention. The bicycle 100 shown in this embodiment is a so-called mountain bike, but the bicycle seat 200 may be used with any suitable bicycle, including, for example, road bikes, hybrid bikes, and electric bikes. The terms "bike" and "bicycle" are used interchangeably herein. In addition, although a preferred embodiment is a bicycle and the seat discussed herein is referred to as a bicycle seat, the seat is not so limited and may be used in other applications, including, for example, other cycles and, more specifically, other pedal-cycles. Such other pedal cycles include, for example, unicycles and tricycles, such as rickshaws and are not limited to those only using human power but include cycles with motorized assist features, such as electric bicycles (ebikes). Accordingly, such a seat may be referred to herein as a seat for a rider.

The bicycle 100 of this embodiment includes a frame 110. A rear wheel 120 is attached to the frame. The rear wheel 120 is drivenly connected to a crankset 130 by a chain 122. The chain 122 engages with a sprocket 124, which may be part of a cassette 126, to be rotated by the chain 122. The sprocket 124 is drivingly connected to the rear wheel 120 such that when the sprocket 124 rotates, the rear wheel 120 rotates.

The crankset 130 includes a pair of pedals 132, each connected to a chainring 134 by a crank 136. A rider rotates the pedals 132 with his or her feet to rotate the chainring 134. The chainring 134 is a sprocket and the chain 122 engages with the chainring 134 to be moved by the chainring 134 as the chainring 134 rotates. The crankset 130 is thus drivingly connected to the sprocket 124 and the rear wheel 120 such that, when the crankset 130 and, more specifically, the pedals 132 and the chainring 134 are rotated, the rear wheel 120 is rotated. The crankset 130 is rotatably attached to the frame 110 in this embodiment.

The bicycle 100 also includes a front wheel 140 connected to a fork 142. The fork 142 is rotatably attached to the frame 110. Handlebars 144 are connected to the fork 142 and thus the front wheel 140. The rider rotates the handlebars 144 to rotate the fork 142 and the front wheel 140 to steer the bicycle 100.

The bicycle seat 200 is connected to the frame 110 by a seat post 150. In some embodiments, the seat post 150 is adjustable toward or away from the frame 110 to adjust the height of the bicycle seat 200. The bicycle seat 200 is positioned above the crankset 130 so that the rider can pedal the bicycle 100 while seated on the bicycle seat 200. The bicycle seat 200 may also be referred to as a saddle or as a seat herein.

Figure 2:
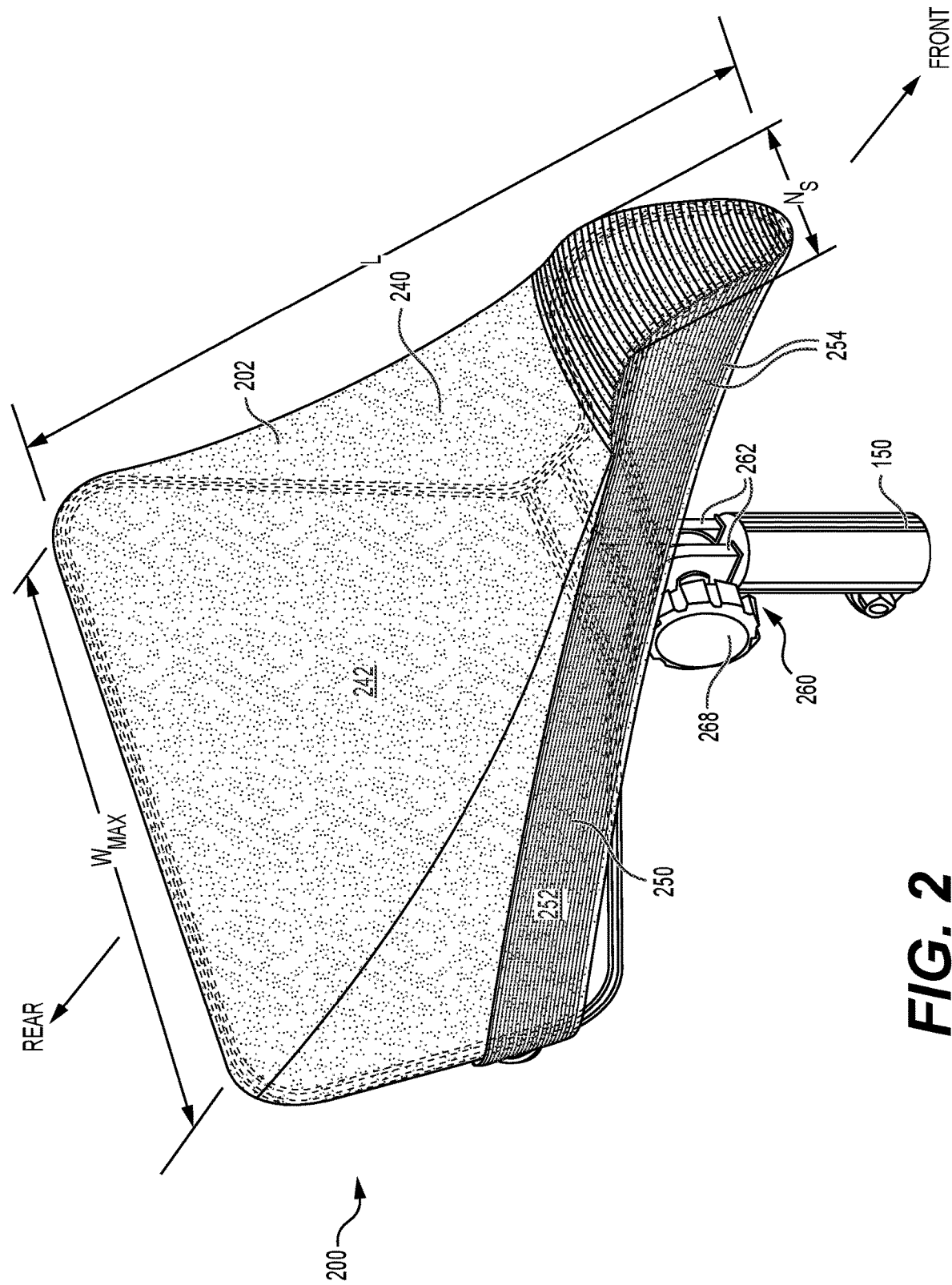
FIG. 2 is a forward view of a seat for the bicycle shown in FIG. 1 according to an embodiment.
Figure 3:
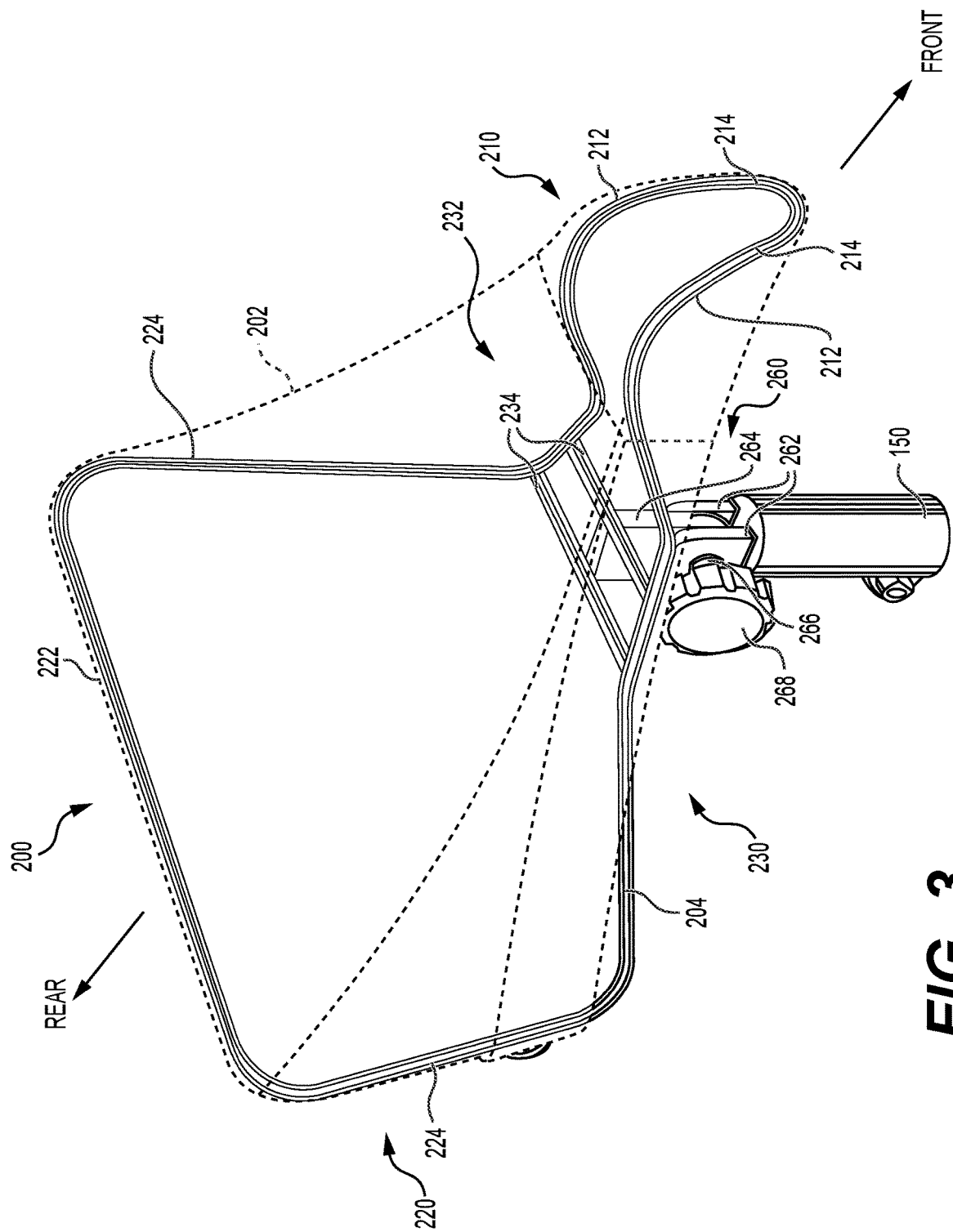
FIG. 3 is the view of the bicycle seat shown in FIG. 2 with a cover of the bicycle seat shown in an outline to illustrate a frame of the bicycle seat.

FIGS. 2 and 3 are perspective views of the bicycle seat 200 shown in FIG. 1. The bicycle seat 200 of this embodiment includes a cover 202 and a frame 204. In FIG. 3, the bicycle seat 200 is shown with the cover 202 in an outline to illustrate the frame 204. In the following discussion of the bicycle seat 200, terms of direction (or derivatives thereof) are taken relative to the bicycle 100 and/or frame 110 of the bicycle 100. Forward is a direction toward the front of the bicycle 100 (e.g., toward the handlebars 144 or front wheel 140) and rearward is a direction toward the back (rear) of the bicycle 100 (e.g., toward the rear wheel 120). Left and right are taken with respect to a rider seated on the bicycle seat 200 looking forward. Upward is a direction away from the frame 110 of the bicycle 100 and downward is a direction toward the frame 110 of the bicycle 100.

The frame 204 of the bicycle seat 200 includes a front portion 210, a rear portion 220, and a central portion 230. The central portion 230 is located between the front portion 210 and the rear portion 220. In this embodiment, the frame 204 is a wire frame shaped to provide strength and to support the cover 202. The frame 204 may be made from any suitable material, including, for example, a metal alloy, such as high carbon steel, or composite, such as a carbon fiber material. The edges of the frame 204 are contoured, such as by being tapered or including a radius on all corners, to avoid damaging the cover 202 or injuring the rider. As will be discussed further below, the frame 204 may also include an elasticity (e.g., spring action) to provide resiliency against road vibrations. The frame 204 may take other suitable constructions beyond being a wire frame. For example, the frame 204 may be a molded plastic or carbon fiber having a plurality of planar surfaces. The edges of the planar surfaces may be located, for example, where the wire frame is shown in FIG. 3.

The cover 202 includes a seating panel 240, and the frame 204 thus supports the seating panel 240. To support the seating panel 240, the front portion 210 includes a seating support portion 212, and the rear portion 220 includes a seating support portion 222. In the embodiment shown in FIGS. 1 and 2, the front portion 210 is a pommel having an upward curving or projecting shape with upper surfaces (or edges) forming the seating support portion 212 of the front portion 210. The front portion 210 may also be referred to as a pommel herein. Similarly, the rear portion 220 is also a raised or upwardly projecting portion of the frame 204 with an upper surface forming the seating support portion 222. In this embodiment, the seating support portion 222 is a portion of the wire frame (a rod) that extends transversely relative to the forward and rearward direction of the bicycle 100. The seating support portion 212 of the front portion 210 and the seating support portion 222 of the rear portion 220 are thus positioned to define a cavity 232 in the central portion 230. The front portion 210 and the rear portion 220 project upward from a lower portion of the frame 204 which is located under the cavity 232. The upwardly extending rear portion 220 forms a cantle of the rear portion 220 and may thus be referred to as a cantle herein.

As noted above, the seating support portion 222 of the rear portion 220 extends transversely. In this embodiment, the rear portion 220 and, more specifically, the seating support portion 222 are wider than the front portion 210. The pommel (front portion 210) is narrower than the cantle (rear portion 220), and the frame 204 may be Y-shaped or T-shaped. The cover 202 is sized and shaped to fit tautly around the frame 204 and thus in this embodiment the cover 202 and the bicycle seat 200 as a whole are triangularly shaped.

The cover 202 of this embodiment is formed from leather or a textile such as a fabric. Such textiles and fabrics may be any suitable material, including woven fabrics formed from either natural or synthetic fibers (e.g., plastics or elastomers). Preferably, the cover 202 is formed from a soft but waterproof (or water-resistant) material that is durable and suitable for use in an outdoor environment where the seat is exposed to the natural elements, such as sunlight and precipitation, like rain and snow. The cover 202 should also not be rigid, but rather possess a pliability that allows the cover 202 to be tightened or loosened at the rider's discretion. The cover 202 is preferably thus a pliable cover formed from a pliable material such as leather, fabric, or other textile. Other pliable materials for the cover 202 include other thin sheets, such as, thin plastic sheets. In some embodiments, the cover 202 may be formed of fabric or other thin sheet material that is stretchable, but in other embodiments, the cover material is not stretchable.

As noted above, the cover 202 includes a seating panel 240. The seating panel 240 is positioned on the top of the bicycle seat 200 and includes a seating surface 242. The seating surface 242 is an outwardly facing surface and, more specifically, an upwardly facing surface of the seating panel 240 on which the rider positions his or her buttocks when seated on the bicycle seat 200. The seating panel 240 spans from the pommel (front portion 210) to the cantle (rear portion 220). The seating panel 240 thus spans over the cavity 232 while being supported vertically by the seating support portion 212 of the front portion 210 and the seating support portion 222 of the rear portion 220. As will be discussed further below, the seating panel 240 spans over the cavity with a tension that keeps the seating panel 240 taut without a person seated thereon, and, in such a state, the seating surface 242 is generally planar and oriented in a generally forward and rear direction. In some embodiments, the seating panel 240 has an upward angle from the forward portion of the seating panel 240 to the rear portion of the seating panel 240. The tension of the seating panel 240 is set such that, when a person sits on the seating surface 242 of the seating panel 240, applying a downward force to the seating surface 242, the seating panel 240 forms a concave shape in the downward direction between the pommel (front portion 210) and the cantle (rear portion 220). The seating panel 240 extends downward into the cavity 232 when a person is seated on the seating surface 242. The seating panel 240 thus provides hammock-like comfort when a person sits on the seating surface 242.

As noted above, the frame 204 provides this hammock-like comfort by allowing the seating panel 240 to move downward into the cavity 232 when a rider sits on the seating surface 242 and to also move upward by the tension of the cover 202 when the rider is not sitting on the seating surface 242. The seating panel 240 is only directly supported by the seating support portion 212 of the front portion 210 and the seating support portion 222 of the rear portion 220, and the frame 204 does not include any intervening supports in the central portion 230 that directly support the cover 202 and, more specifically, the seating panel 240. The seating panel 240 is thus suspended within the cavity 232.

Another advantage of the bicycle seat 200 is that the surface area of the seating surface 242 is much larger than traditional seats. In addition to having hammock-like comfort, the rider's weight can be distributed over a larger area reducing pressure points on his or her buttocks. The seating surface 242 of embodiments herein may have a length L that is greater than 12 inches. In some embodiments, the length L of the seating surface 242 is from 12 inches to 16 inches and more preferably from 13 inches to 15 inches. Likewise, the seating surface 242 has a maximum width $W_{max}$ that is greater than 7 inches. The maximum width $W_{max}$ may be greater than 10 inches, such as from 10 inches to 14 inches. In this embodiment, the maximum width $W_{max}$ is the rear-most portion of the seating surface 242. As noted above, the rear portion 220 of the frame 204 is wider than the front portion 210 of the frame 204, and the seating surface 242 thus includes a forward width $W_f$ at a forward portion of the seating surface 242. This forward width $W_f$ may be the width of the nose of the seat and thus may be taken as the width of the seating panel 242 where it is supported by the supporting portion 212 of the front portion 210 of the frame 204. In many instances the forward-most portion of the cover 202 is rounded or curved and thus the forward width $W_f$ may be taken a distance from the forward tip of the seating surface 242 to avoid this curvature, such as 0.2 inches from the tip or 0.25 inches from the tip. The forward width $W_f$ may be taken, for example between 0.2 inches and 1 inch from the tip or, more preferably at about 0.5 inches from the tip. The forward width $W_f$ of the seating surface 242 may be about 2.5 inches. Accordingly, the maximum width $W_{max}$ of the seating panel 242 may be at least three times the width of the forward width $W_f$. More preferably, the maximum width $W_{max}$ is at least four times the width of the forward width $W_f$, such as from four times to six times the width of the forward width $W_f$.

The cover 202 also includes a plurality of side panels 250 spanning from the front portion 210 to the rear portion 220. In this embodiment, there are two side panels 250: a left side panel and a right side panel. In FIG. 2, the right side panel is visible but the left side panel is a mirror image of the right side panel, and the following discussion applies to the left side panel. As used herein, side panel 250 will refer to either the left side panel or the right side panel or both. The side panel 250 includes a side surface 252. The side panel 250 is at an angle different from the seating panel 240. More specifically in this embodiment, the side panel 250 is positioned obliquely or orthogonally to the seating panel 240 and the side surface 252 faces outward from the seat in a direction different from the upward direction. The side surface 252 of the right side panel 250 faces toward the right and forward, and the side surface 252 of the left side panel 250 faces toward the left and forward. The forward-facing aspect of the side surfaces 252 is a result of the bicycle seat 200 having a triangular shape, with the apex of the triangular shape being at the front of the bicycle seat 200.

The side panel 250 spans from the front portion 210 of the frame 204 to the rear portion 220 of the frame 204. The front portion 210 includes side support portions 214, which in this embodiment are the forward surfaces of the front portion 210. The rear portion 220 includes upwardly extending side support portions 224 positioned on either end of the seating support portion 222 and extending upward from the central portion 230 to the seating support portion 222. The side panel 250 is supported by and tensioned between a side support portion 214 of the front portion 210 and a side support portion 224 of the rear portion 220. As noted above, the frame 204 has a Y-shape (or a T-shape), and thus the side panel 250 is spaced apart from the frame 204 in the central portion 230 of the frame 204, allowing the side panel 250 to move laterally inward, such as forming a concave inward shape, when a force is applied to the side surface 252. The frame 204 is shaped to support the side panel 250 at the front portion 210 of the frame 204 and at the rear portion 220 of the frame 204 to allow the side panel 250 to move laterally inward therebetween.

The side panels 250 of this embodiment provide the tension to hold the cover 202 on the frame 204 and thus may be referred to as tensioning panels. In one embodiment, each side panel 250 has a tension that is greater than that of the seating panel 240. This allows the seating panel 240 to form the concave shape into the cavity 232, while still providing a taut cover 202. In some embodiments, the fabric of the side panels 250 is heavier and/or stiffer than for the seating panel 240, but in other embodiments, elastomeric fibers 254 may be included in the side panel 250 and oriented in the longitudinal direction (forward and rear direction) of the side panel 250 to provide the extra tension. The side panel 250 is thus elastically deformable in the longitudinal direction of the side panel 250, with the side panel 250 and, more specifically, the elastomeric fibers 254 providing a biasing force to contract the side panel 250 in the longitudinal direction. The elastomeric fibers 254 are an example of a biasing member embedded in the side panel 250. In addition, the upwardly extending side support portions 224 allow for some elastic forward and rear movement (e.g., spring action) keeping the cover 202 and, more specifically, the side panels 250 taut. Having some elasticity within the frame 204 (forward and rear movement) may be preferred in embodiments where the material used for the cover 202 is not stretchable, as the frame 204 thus provides elasticity to keep the cover taut. This elasticity of the frame 204 and, more specifically, the side support portions 224 and/or the elasticity of the side panel 250 also provide resiliency against road vibrations.

In addition to providing tension, the side panels 250 may be used to help turn the bicycle 100. The side panel 250 and, more specifically, the side surface 252 provide a surface into which a rider can press to lean and thus turn the bicycle 100. The side panels 250 are sized and positioned to allow the rider to press his or her inner thigh against the side surface 252. In this way the bicycle seat 200 provides not only for comfort, but also for enhanced control of the bicycle. Moreover, the side panels 250 provide stability to the seating panel 240. The side panels 250 are attached to the seating panel 240, and in the embodiments shown herein each side panel 250 is sewn to a peripheral side edge of the seating panel 240 forming a seam between the side panel 250 and the seating panel 240. The side panel 250, attached to the seating panel 240 and positioned in the frame 204 in this manner, also provides stability to lateral movement of the seating panel 240. Without the side panels 250 lateral movement of the seating panel 240 is restricted by the tension in the seating panel 240 alone. Thus, to prevent the seating panel 240 from swinging laterally, the tension should be increased, which inhibits the hammock-like effect of the seating panel 240. The side panel 250 thus helps prevent lateral movement (swinging) of the seating panel 240 on the frame 204 by securing the cover laterally on the frame 204.

As shown in FIG. 3, the frame 204 is connected to the seat post 150 of the bicycle 100. The frame 204 may be connected to the seat post 150 by any suitable means. In this embodiment, the frame 204 is attached to an upper end of the seat post 150 by a pivotable connection to allow for pivotable movement of the frame 204 relative to the bicycle 100 and, more specifically, the seat post 150. Any suitable pivotable connection may be used, but in this embodiment the pivotable connection is a clevis fastener 260. The clevis fastener 260 includes a clevis 262, a tang 264, and a clevis pin 266. One of the clevis 262 and the tang 264 is attached to the upper end of the seat post 150 and the other of the clevis 262 and the tang 264 is attached to the frame 204. In FIG. 3, the clevis 262 is attached to the upper end of the seat post 150 and the tang 264 is attached to the frame 204. A pair of lateral stays 234 is positioned in the central portion 230 of the cover 202 and connects left and right portions of the wire frame 204. The tang 264 is attached to the lateral stays 234.

The tang 264 is inserted between the U-shaped prongs of the clevis 262. The clevis pin 266 is inserted through a hole in one of the prongs of the clevis 262, then through the tang 264, before being inserted into the other prong of the clevis 262. The clevis pin 266 of this embodiment is a threaded pen that engages with threads formed in one of the prongs of the clevis 262 or a nut. The clevis pin 266 can thus be tightened to maintain the orientation of the bicycle seat 200 or loosened to allow the bicycle seat 200 to be pivoted. The clevis pin 266 includes a knob 268 that can be used to tighten or loosen the clevis pin 266 and thus the clevis fastener 260 by hand.

Figure 4:
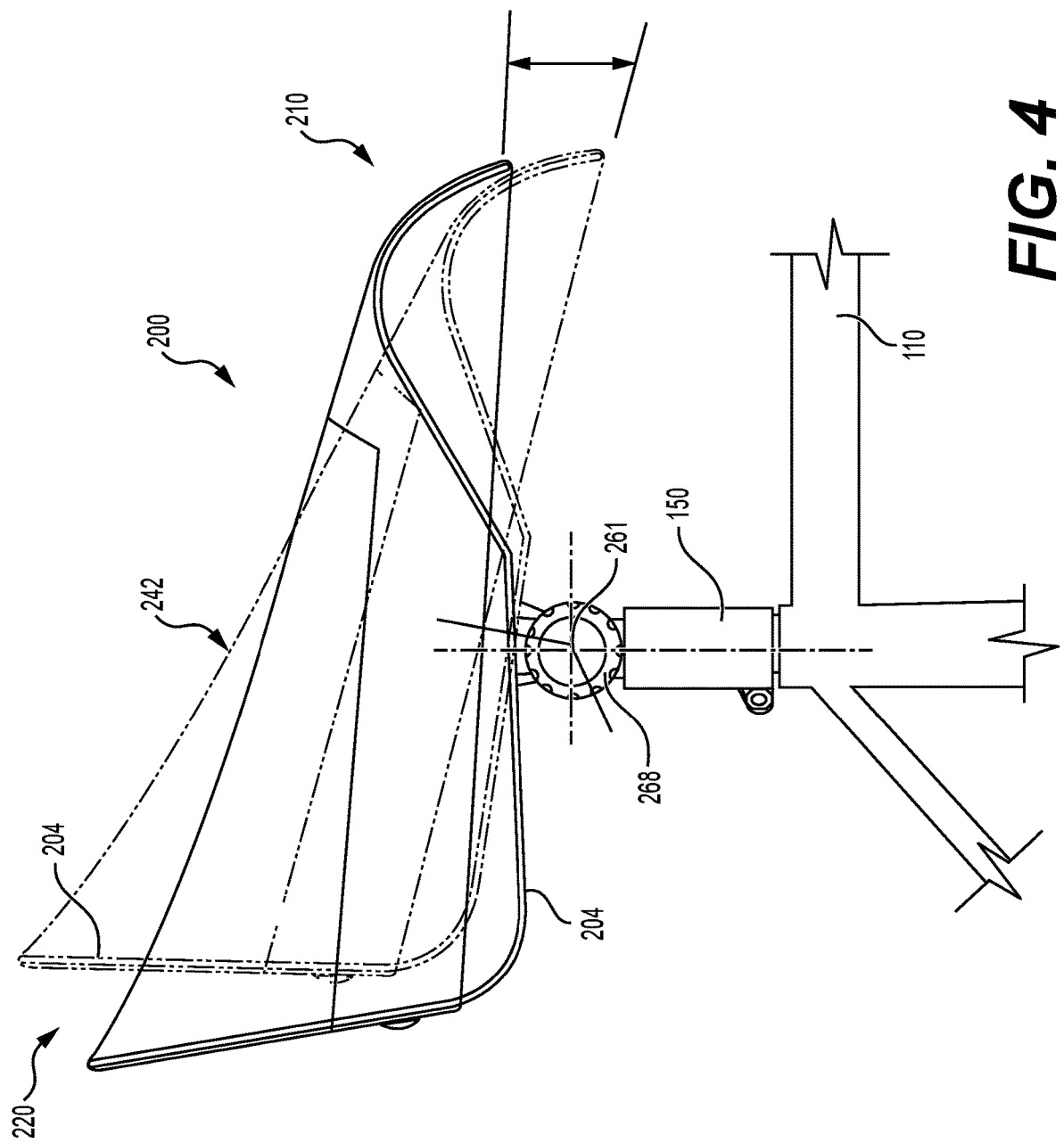
FIG. 4 is a side view of the bicycle seat shown in FIG. 2 showing different pivotable orientations of the bicycle seat.

FIG. 4 is a side view of the bicycle seat 200 and illustrates the pivotable movement of the bicycle seat 200. The pivotable connection (clevis fastener 260) and, more specifically, a pivot axis 261 is oriented to allow the front portion 210 to be moved upward and downward. The front portion 210 can be positioned in a first, upward position that is generally horizontal for comfort. But when the bicycle 100 is being used for speed and performance, the front portion 210 can be pivoted downward (moved toward the frame) from the first position to a second position. In this orientation, the bicycle seat 200 and, more specifically the seating surface 242 (when taut) is angled upwardly from forward to back.

Figure 5:
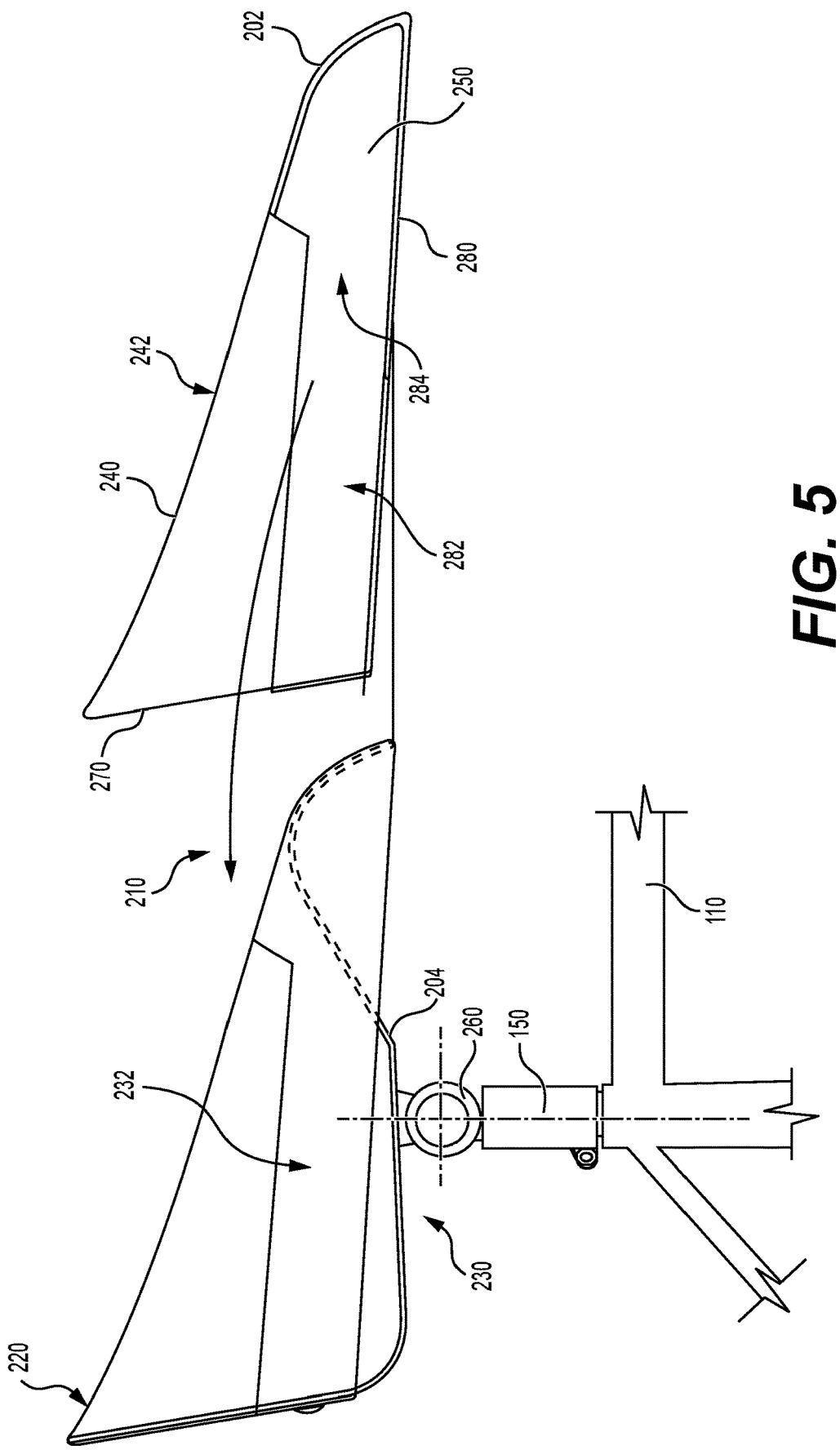
FIG. 5 is a side view of the bicycle seat shown in FIG. 2 showing a process to attach the cover to the frame.

As shown in FIG. 5, the cover 202 of this embodiment is removable and replaceable. FIG. 5 illustrates the cover 202 being attached to the frame 204. The cover 202 may also include a rear panel 270 (see also FIG. 6) and an underside panel 280. An opening 282 is formed in the underside of the cover 202 to allow the frame 204 to be connected to the seat post 150 by, in this embodiment, the clevis fastener 260. The underside panel 280, side panels 250, and seating panel 240 are connected to each other to form a pocket 284. To attach the cover 202, the cover 202 slides over the front portion 210 of the frame 204 such that the front portion 210 is positioned within the pocket 284, such as by inserting the front portion 210 (pommel) into the pocket 284. The cover 202 then is stretched between the front portion 210 and the rear portion 220 to position the seating panel 240 and the side panels 250 as discussed above. The cover 202 may be stretched with the rear panel 270 being positioned behind the rear portion 220 (cantle) with the seating panel 240 and the side panels 250 being attached to the rear panel 270. The cover 202 may be attached to the frame 204 by any suitable means. The cover 202 may be held in place by the tension in the cover 202, but the cover 202 may also be attached to the frame 204 by other means such as by using a fastener, like a snap 272 (see FIG. 6), to engage the cover 202 with the frame 204 and, more specifically, the rear panel 270 with the rear portion 220 of the frame 204. The opposite process is used to remove the cover 202.

Figure 6:
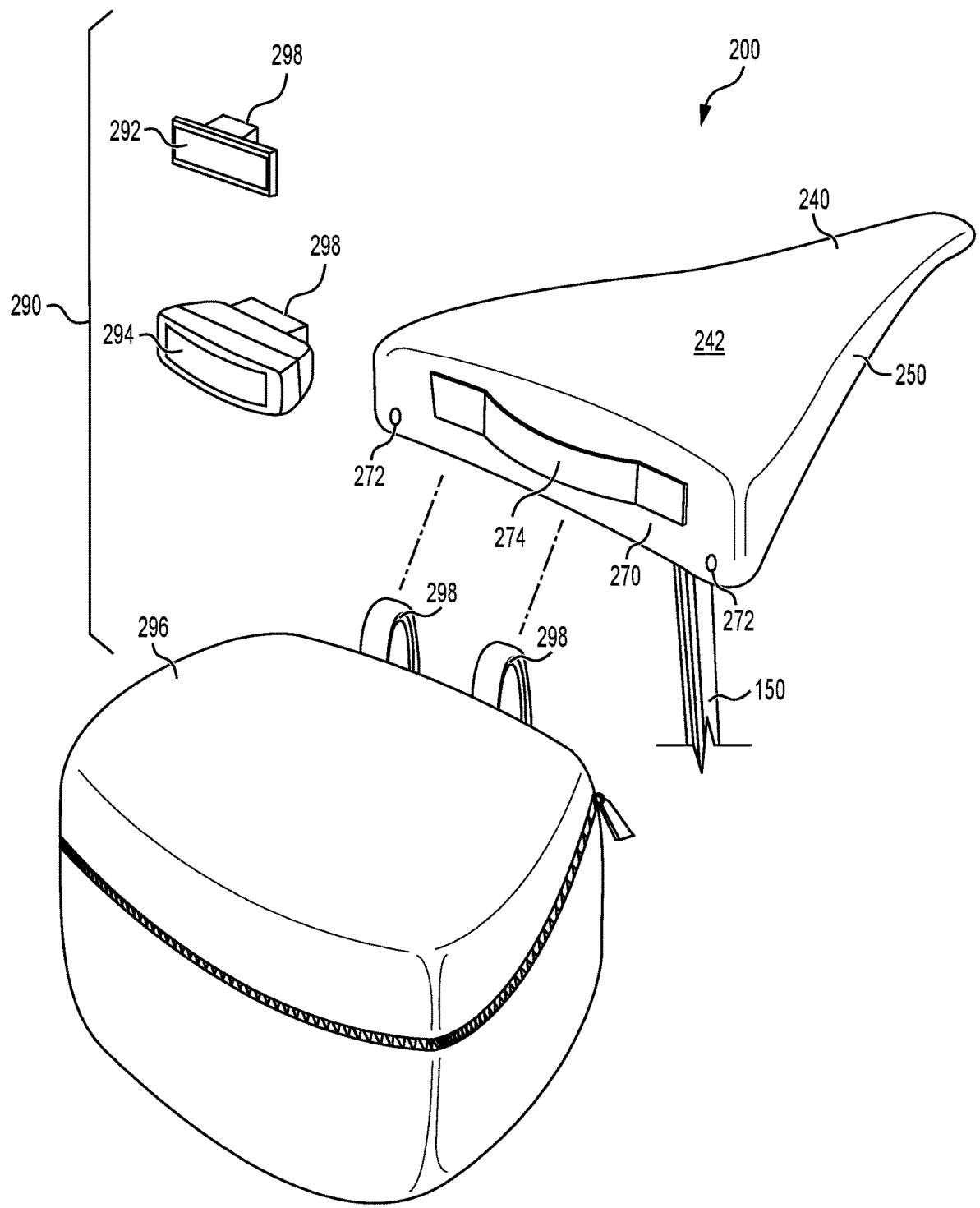
FIG. 6 is a rear view of the bicycle seat shown in FIG. 2.

FIG. 6 is a rear view of the bicycle seat 200 showing the rear panel 270. As discussed above, the bicycle seat 200 of the embodiments discussed herein is larger than many traditional bicycle seats, resulting in a larger rear panel 270 and allowing for accessories 290 to attached thereto. The rear panel 270 thus includes an accessory connection, which in this embodiment is a mounting strap 274. The mounting strap 274 may be any suitable strap, such as a nylon strap, that can be attached to the rear panel 270 and support the weight of the accessories 290 without damage to the mounting strap 274. The mounting strap 274 may be attached to the rear panel 270 by any suitable means, such as by sewing. In this embodiment, each end of the mounting strap 274 is sewn to the rear panel 270 to position the mounting strap 274 transversely to the longitudinal direction of the bicycle seat 200. The length of the mounting strap 274 is set to have at least one loop to which various accessories 290 can be attached. Such accessories include, for example, a reflector 292, a light 294 (such as a red blinking light), and a storage container 296. Each of these accessories 290 may include a hook 298 or other suitable attachment portion that is configured to engage with the mounting strap 274, such as by siding over the top of the mounting strap 274 and into the loop between the mounting strap 274 and the rear panel 270.

Figure 7:
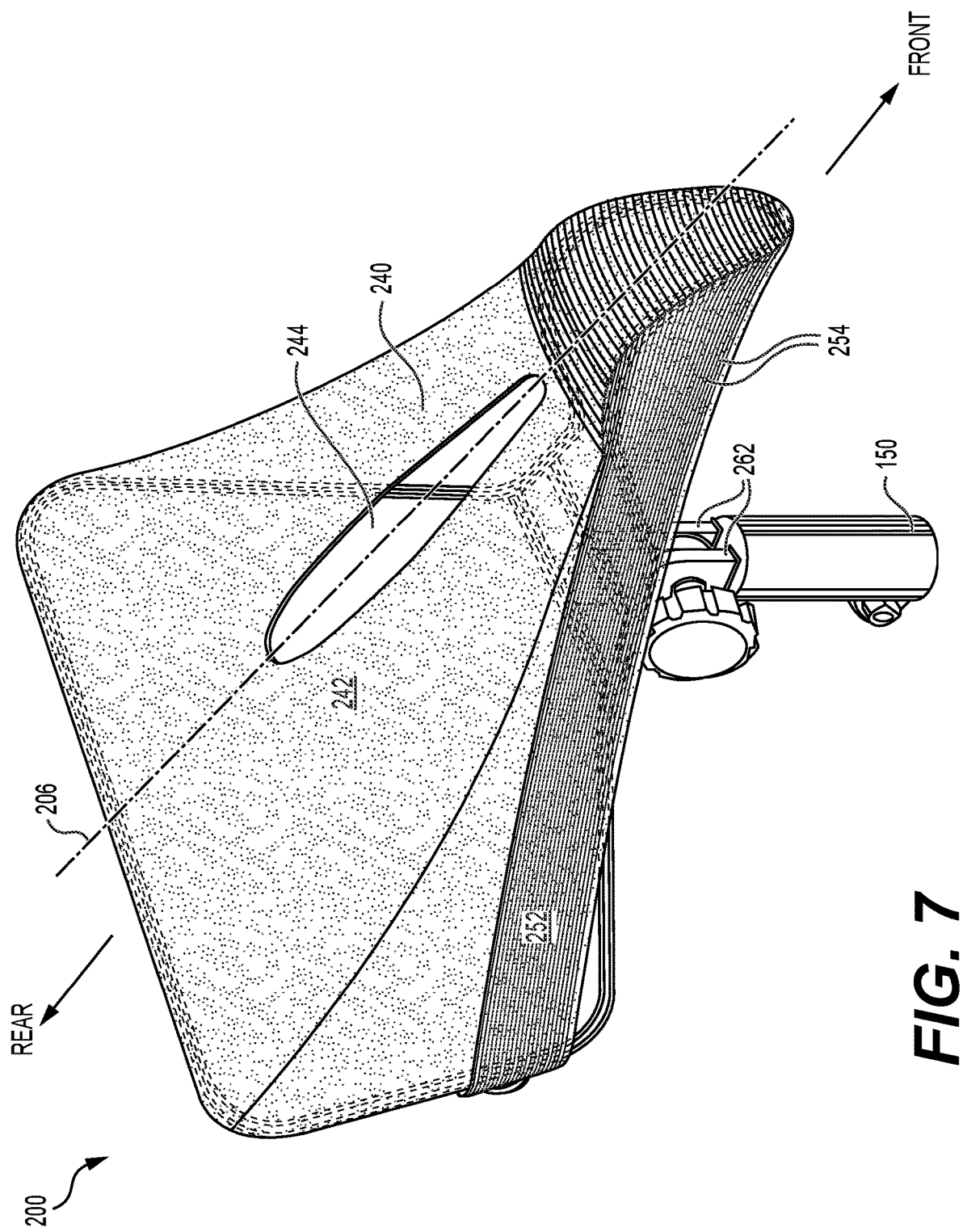
FIG. 7 is a forward view of a variation of the bicycle seat shown in FIG. 2.

In some embodiments, the seating surface 242 may include an opening 244, as shown in FIG. 7. The seating surface 242 exerts pressure on the rider, and the opening 244 may be positioned in the seating surface 242 to avoid exerting pressure on select portions of the rider. For example, the opening 244 may be positioned to relieve soft tissue pressure. As shown in FIG. 7, the bicycle seat 200 includes a longitudinal centerline 206 and the opening 244 is positioned with the longitudinal centerline 206 extending therethrough. The opening 244 is also an elongated opening that is elongated in the longitudinal direction (forward and rear direction) of the bicycle seat 200 and, more specifically, the seating panel 240. The opening 244 is positioned over the cavity 232. In FIG. 7, the opening 244 is shown as having an elliptical shape, but any suitable shape may be used.

Figure 8:
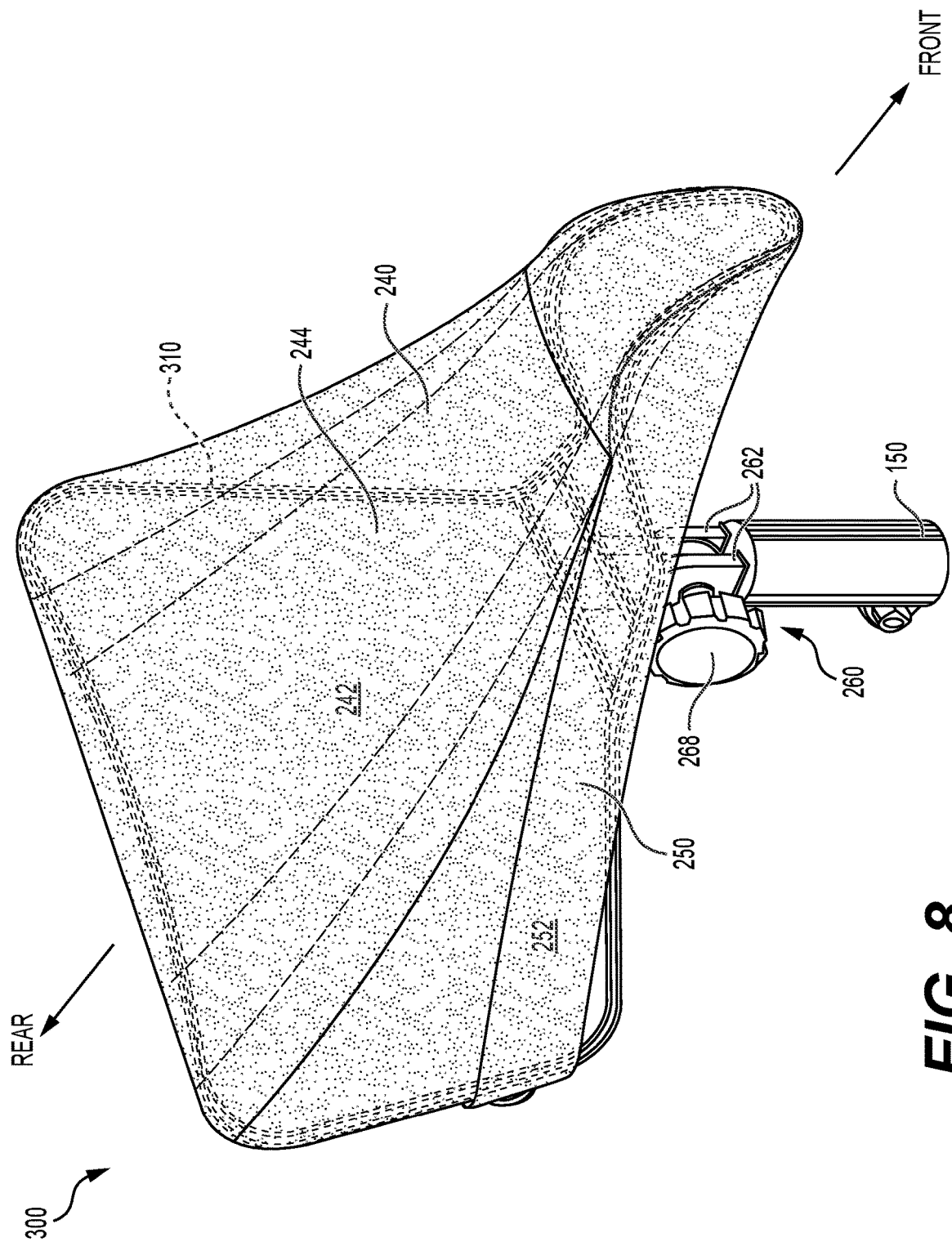
FIG. 8 is a forward view of a seat for the bicycle shown in FIG. 1 according to another embodiment.
Figure 9:
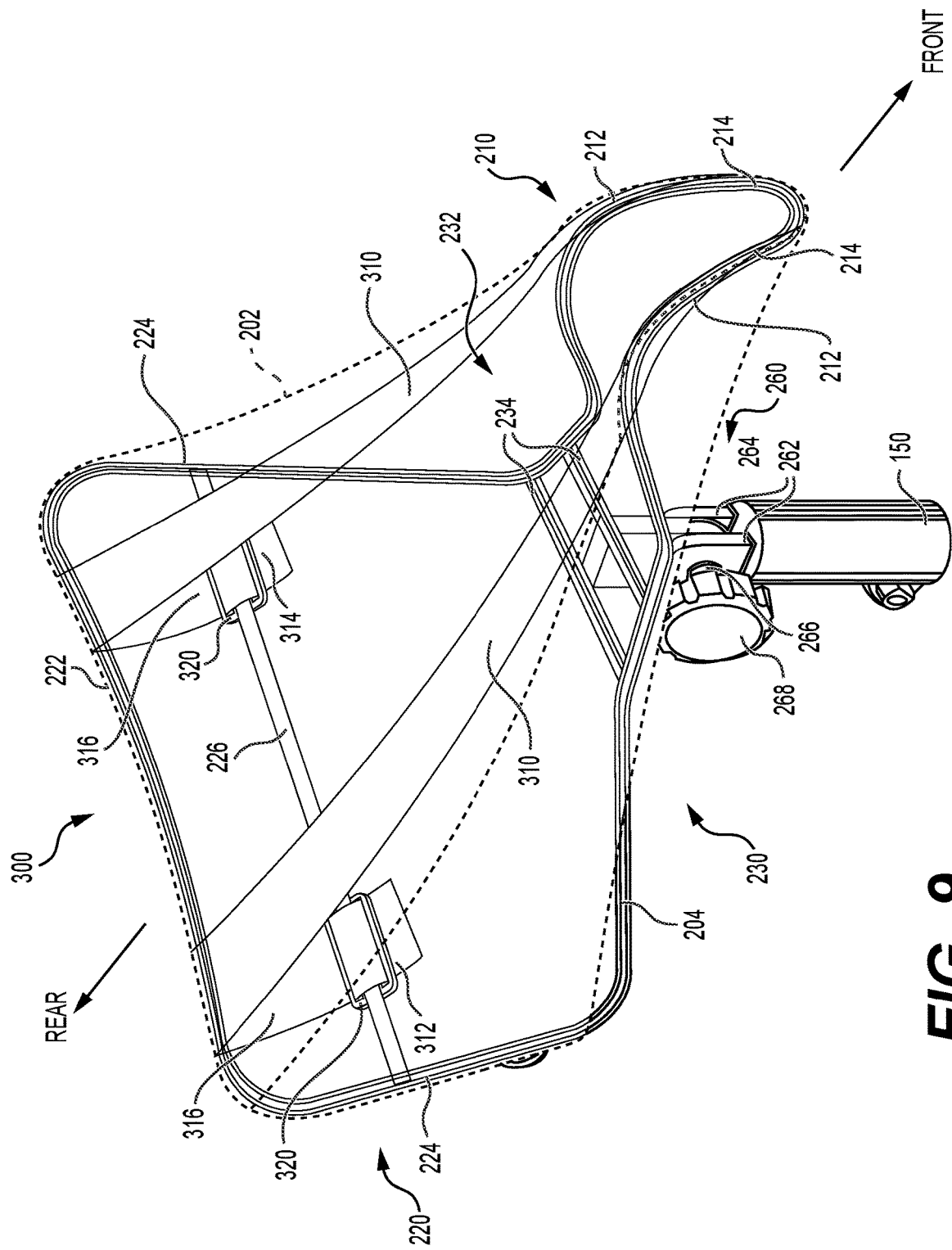
FIG. 9 is the view of the bicycle seat shown in FIG. 8 with a cover of the bicycle seat shown in an outline to illustrate a frame of the bicycle seat.
Figure 10:
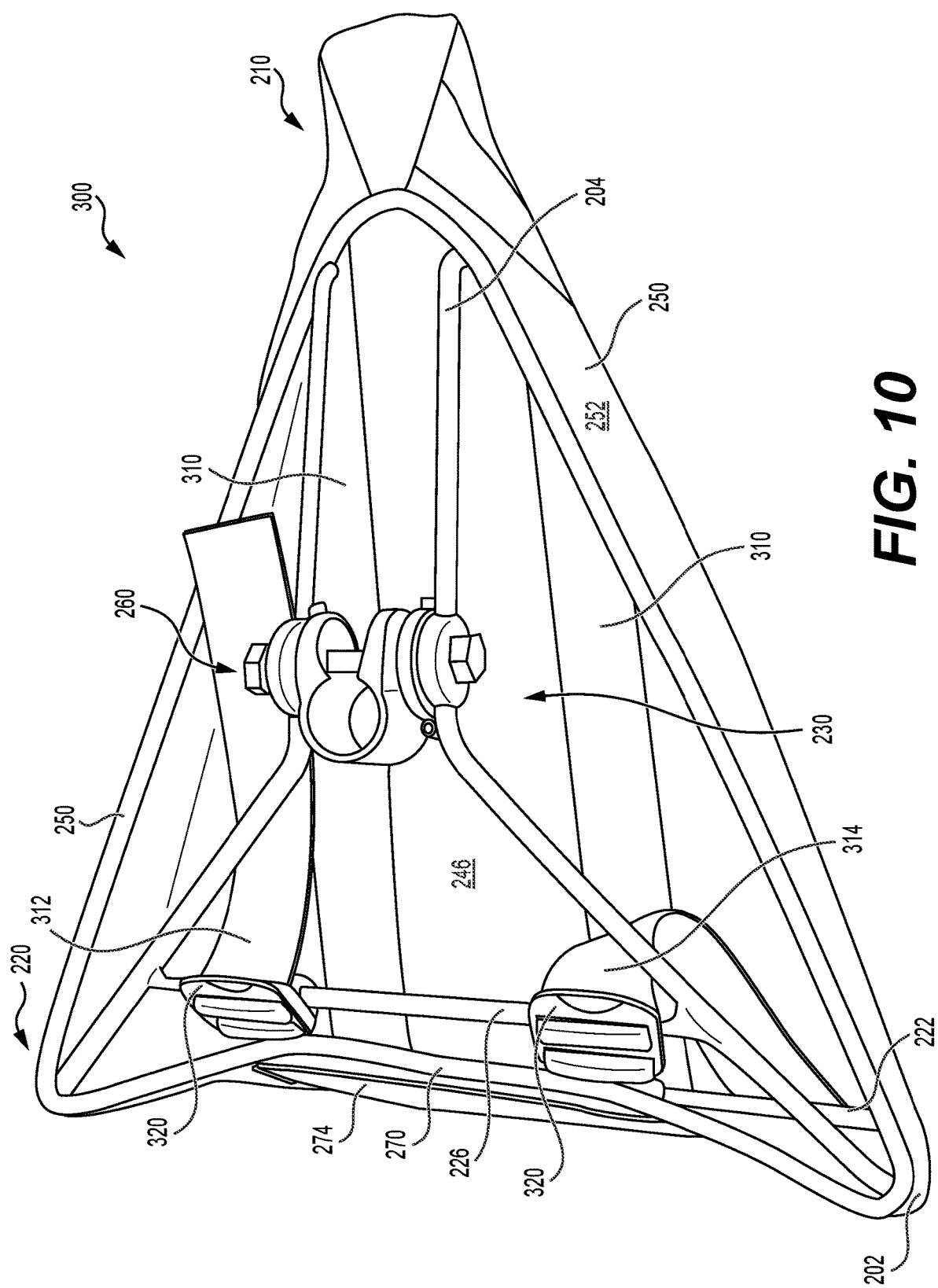
FIG. 10 is an underside view of the bicycle seat shown in FIG. 8.

FIGS. 8 to 10 show a bicycle seat 300 for the bicycle 100 shown in FIG. 1 according to another embodiment. The bicycle seat 300 of this embodiment is similar to the bicycle seat 200 discussed above with reference to FIGS. 3 and 4. The same reference numerals will be used for components of the bicycle seat 300 of this embodiment that are the same or similar to the components of the bicycle seat 200 discussed above. The discussion of such components applies in this embodiment and a detailed description of these components is omitted here. FIGS. 8 and 9 are perspective views of the bicycle seat 300. In FIG. 9, the bicycle seat 300 is shown with the cover 202 in an outline to illustrate the frame 204. FIG. 10 is an underside view of the bicycle seat 300 shown in FIGS. 8 and 9.

In the embodiment discussed above, the cover 202 of the bicycle seat 200 was secured to the frame 204 and tensioned by stretching the fabric of the cover 202 over the frame 204, and, more specifically in some embodiments, the side panels 250 provide the tension to hold the cover 202 on the frame 204. The cover 202 may be secured and/or tensioned by other suitable means. In this embodiment, the bicycle seat 300 includes at least one tensioning strap 310 used to secure the cover 202 to the frame 204 and to tension the cover 202. The tensioning strap 310 is a nylon strap in this embodiment, but any suitable strap may be used.

The tensioning strap 310 is attached to the cover 202. The tensioning strap 310 includes a first end 312 and a second end 314. At least one end of the tensioning strap 310 is connected to the frame 204 to attach the cover 202. In this embodiment, both of the first end 312 and the second end 314 are connected to the frame 204. The tensioning strap 310 may be adjustably attached to the frame 204. The tensioning strap 310 may include an adjustable length portion 316, the length of which can be adjusted to adjust or change the tension in the cover 202.

The tensioning strap 310 may be attached to the cover 202 in any suitable position. In this embodiment, the tensioning strap 310 is attached to the seating panel 240 and, more specifically, an underside surface 246 of the seating panel 240. The tensioning strap 310 may be attached to the underside surface 246 by any suitable means including, for example, sewing. The adjustable length portion 316 may be the portion of the tensioning strap 310 from its attachment point to the cover 202 to its connection or attachment point to the frame 204. In this embodiment, the tensioning strap 310 is positioned over the seating support portion 222 and then connected to a portion of the frame 204 below the seating support portion 222. The connection point of the tensioning strap 310 to the frame 204 in this embodiment is a lateral bar 226. The lateral bar 226 is located on the rear portion 220 of the frame 204 at a level lower than the bar forming the seating support portion 222. The lateral bar 226 extends in a transverse direction and is attached to each side support portion 224.

A buckle 320 is used to set the length of the adjustable length portion 316. The buckle 320 is used to hold the tensioning strap 310 and prevent the adjustable length portion 316 from changing length without interaction from the user. The buckle 320 may be directly attached, such as by welding, to the lateral bar 226 or alternatively the tensioning strap 310 is wrapped around the lateral bar 226 before being engaged with the buckle 320. Any suitable buckle 320 may be used. Preferably, the buckle 320 is configured to release the tensioning strap 310 and allows the adjustable length portion 316 to be increased. Suitable buckles include, for example a tri-bar (or tri-glide) slide buckle.

The tensioning strap 310 of this embodiment forms a U-shape or a V-shape. From the first end 312, the tensioning strap 310 extends from the lateral bar 226 over the seating support portion 222. The tensioning strap 310 then spans over the central portion 230 from the seating support portion 222 of the front portion 210 to the seating support portion 212 of the front portion 210 on the right side of the frame 204. The tensioning strap 310 loops back to the seating support portion 212 of the front portion 210 on the left side of the frame 204 before spanning back over the central portion 230 to the seating support portion 222 of the rear portion 220. Then, the tensioning strap 310 extends back down from the seating support portion 222 to the lateral bar 226 to end at the second end 314.

The tensioning strap 310 may be attached to other portions of the cover 202. For example, the tensioning strap 310 may be attached to the side panel 250 with the tensioning strap 310 spanning the distance between the side support portions 224.

As noted above, the seating support portion 222 may be a bar. This bar may be rectilinear, but it may also be curvilinear having, for example, an arcuate shape.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A seat for a rider comprising:
   a frame including a front portion, a rear portion, and a central portion between the front portion and the rear portion, each of the front portion and the rear portion having a supporting portion, the supporting portion of the front portion and the supporting portion of the rear portion being positioned to define a cavity in the central portion; and
   a cover including:
      a seating panel supported by the supporting portions of the front portion of the frame and the rear portion of the frame to span over the cavity, the seating panel including a seating surface and an underside surface, the seating surface facing an upward direction;
      a plurality of side panels spanning from the front portion to the rear portion, each side panel including a side surface facing outward from the seat in a direction different from the upward direction; and
      at least one tensioning strap adjustable in length to adjust the tension of the seating panel, the at least one tensioning strap directly supporting the underside surface of the seating panel, the tensioning strap spanning from the front portion of the frame to the rear portion of the frame over the cavity, the tensioning strap being adjustably attached to the rear portion of the frame to have at least one length that allows the seating panel to extend downward into the cavity when a person is seated on the seating surface.

2. The seat of claim 1, wherein the seating panel is only supported by the supporting portions of the front portion of the frame and the rear portion of the frame.

3. The seat of claim 1, wherein the frame is shaped to support the side panels at the front portion of the frame and at the rear portion of the frame to allow the side panels to move laterally inward therebetween.

4. The seat of claim 1, wherein the seating panel has a maximum width and a forward width, the forward width being the width of the seating panel at the supporting portion of the front portion of the frame, the maximum width of the seating panel being at least three times the width of the forward width.

5. The seat of claim 1, wherein the at least one tensioning strap is directly attached to a forward portion of the underside surface of the seating panel.

6. The seat of claim 1, wherein the cover includes a rear panel, the rear panel including an accessory connection.

7. The seat of claim 6, wherein the accessory connection is a mounting strap.

8. A bicycle comprising:
a frame;
a seat post extending from the frame; and
the seat of claim 1 connected to the seat post.

9. The bicycle of claim 8, wherein the seat is pivotably connected to the seat post by a pivotable connection, the pivotable connection including a pivot axis, the pivot axis being oriented to allow the front portion of the frame of the seat to be moved toward and away from the frame of the bicycle.

10. A seat for a rider comprising:
a frame including a front portion, a rear portion, and a central portion between the front portion and the rear portion; and
a cover including:
a seating panel including a seating surface and an underside surface, the seating surface facing an upward direction, the seating panel being supported by the front portion of the frame and the rear portion of the frame and unsupported by the central portion of the frame;
a plurality of side panels spanning from the front portion to the rear portion, each side panel including a side surface facing outward from the seat in a direction different from the upward direction; and
at least one tensioning strap adjustable to adjust the tension of the seating panel, the at least one tensioning strap being directly, fixedly attached to the underside surface of the seating panel.

11. The seat of claim 10, wherein the at least one tensioning strap is adjustably attached to the frame.

12. The seat of claim 11, wherein the at least one tensioning strap includes an adjustable length portion, the length of which can be adjusted to adjust the tension of the seating panel.

13. The seat of claim 12, wherein the adjustable length portion is a portion of the tensioning strap from an attachment point to the underside surface of the seating panel to a connection point to the frame.

14. The seat of claim 10, wherein the at least one tensioning strap is connected to the rear portion of the frame.

15. A seat for a rider comprising:
a frame including a front portion, a rear portion, and a central portion between the front portion and the rear portion, each of the front portion and the rear portion having a supporting portion, the supporting portion of the front portion and the supporting portion of the rear portion being positioned to define a cavity in the central portion; and
a cover including:
a seating panel supported by the supporting portions of the front portion of the frame and the rear portion of the frame to span over the cavity, the seating panel including a seating surface and an underside surface, the seating surface facing an upward direction;
a plurality of side panels spanning from the front portion to the rear portion, each side panel including a side surface facing outward from the seat in a direction different from the upward direction; and
at least one tensioning strap adjustable in length to adjust the tension of the seating panel, the at least one tensioning strap directly supporting the underside surface of the seating panel, the at least one tensioning strap being connected to the frame at a connection position on the frame lower than the supporting portion of the rear portion of the frame and being adjustable in length in a direction transverse to the seating panel between the connection position on the frame and the supporting portion of the rear portion of the frame.

16. The seat of claim 15, wherein the at least one tensioning strap is positioned over the supporting portion of the rear portion of the frame.

17. The seat of claim 15, further comprising a buckle engaged with the at least one tensioning strap to set a length of the at least one tensioning strap.

18. The seat of claim 15, wherein the frame includes a lateral bar extending in a direction that is transverse to a longitudinal direction of the seat, the at least one tensioning strap being connected to the lateral bar.

19. The seat of claim 18, wherein the lateral bar is located on the rear portion of the frame at a level lower than the supporting portion of the rear portion of the frame.

20. The seat of claim 1, further comprising a buckle engaged with the at least one tensioning strap to set a length of the at least one tensioning strap.

* * * * *